United States Patent

Morris

[15] 3,681,559
[45] Aug. 1, 1972

[54] INDUCTION COIL FOR HIGH FREQUENCY WELDING

[72] Inventor: Jack Morris, Orange, Conn.

[73] Assignee: Olin Corporation

[22] Filed: March 30, 1971

[21] Appl. No.: 129,523

[52] U.S. Cl. ..................................219/10.79, 219/8.5
[51] Int. Cl. .............................................H05b 9/02
[58] Field of Search..........................219/10.79, 8.5

[56] References Cited

UNITED STATES PATENTS 3,077,528   2/1963   Kennedy, Jr................219/10.79

Primary Examiner—J. V. Truhe
Assistant Examiner—Hugh D. Jaeger
Attorney—Paul Weinstein, Robert H. Bachman and Gordon G. Menzies

[57] ABSTRACT

A single turn induction coil adapted to operate at high power levels, particularly for welding copper and copper base alloy strip into tubing. The coil comprises a split cylindrical member defining a longitudinally extending gap, nose portions extending out from the cylindrical member on both sides of the gap, web members conductively attached on both sides of the gap to the cylindrical member, and the nose portions, and cooling means heat conductively bonded to the cylindrical member, the nose portions and the web members.

2 Claims, 5 Drawing Figures

JACK MORRIS
INVENTOR

BY Paul Wernoth
ATTORNEY

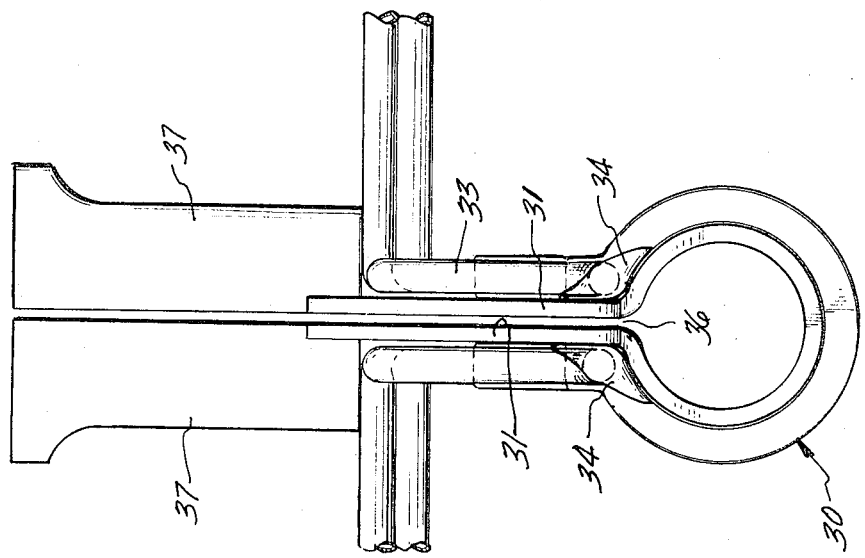
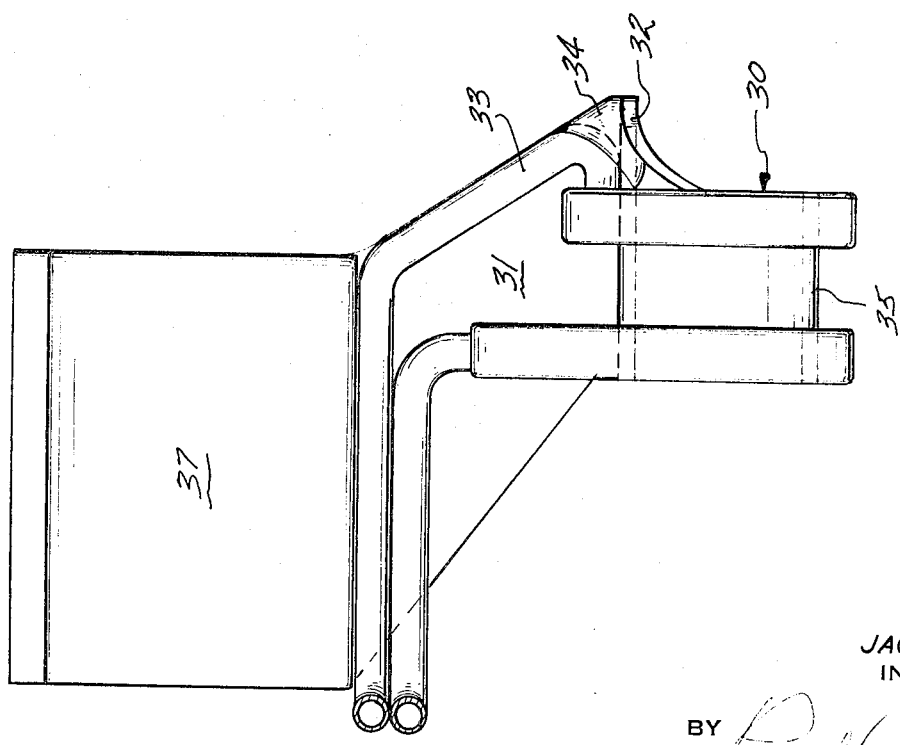

INDUCTION COIL FOR HIGH FREQUENCY WELDING

BACKGROUND OF THE INVENTION

In the art of welding metal strip into tubing, it is known to use high frequency induction welding. A typical example of a prior art welding apparatus and process is set out in U.S. Pat. No. 3,037,105, granted May 29, 1962.

A key element in the apparatus is the coil employed for inducing the current into the strip. When welding metals such as aluminum or steel, coils known in the art are usually adequate. However, when one attempts to weld copper or copper base alloys, greater difficulties are encountered because of the high conductivity of the copper or copper base alloy. Therefore, it is necessary to operate the induction coil at high power levels.

In the conventional welding apparatus, a single turn coil is commonly used wherein the single turn comprises a split cylindrical member having a nose portion. A cooling means is conductively bonded to the cylindrical portion of the coil but not the nose portion. When such a coil is employed at the high power levels necessary in welding copper or copper base alloys, the nose portion tends to get exceedingly hot and has a great propensity to burn.

SUMMARY OF THE INVENTION

In accordance with this invention, an induction coil having a single turn formed of a split cylindrical member with a nose portion is provided with a cooling means conductively bonded to the cylindrical portion and the nose portion of the coil. By this means, the problem of burn-out and overheating of the nose of the coil is overcome.

It is accordingly an object of this invention to provide an induction coil for use in the welding of copper or copper base alloy tubing wherein the coil comprises a split cylindrical member having a nose portion and wherein the nose portion has cooling means conductively bonded to it.

It is a further object of this invention to provide a coil as above having increased life and efficiency and maximum nose length.

Other objects and advantages will become apparent from the following description and drawings.

BRIEF DESCRIPTION OF THE DRAWINGS

FIG. 3 shows front and side views of an induction coil in accordance with this invention.

DESCRIPTION OF THE PREFERRED EMBODIMENTS

Figure 1:
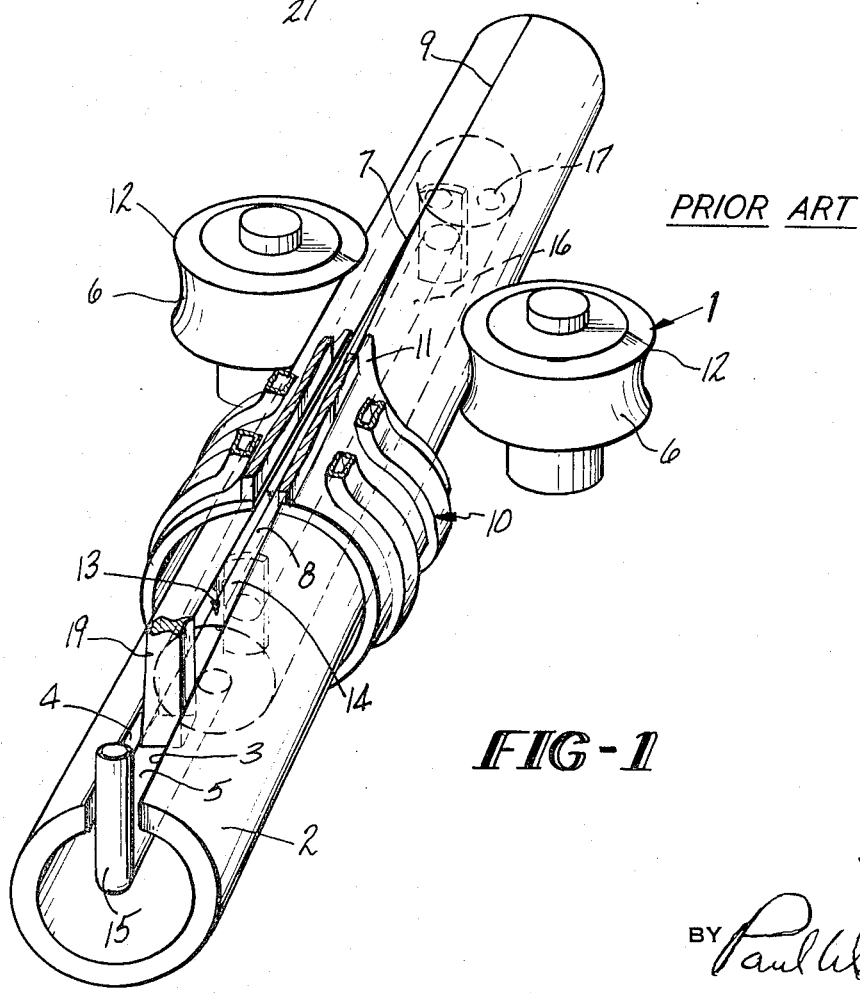
FIG. 1 is a schematic view of a typical prior art high frequency welding apparatus in which the coil of this invention may be employed.

Referring now to the drawings and especially to FIG. 1, there is illustrated a typical welding apparatus 1 for welding metal strip in the form of a preformed open tube 2 into tubing. The apparatus is adapted to weld together the opposed edges 3 and 4 which form the longitudinal gap 5 in the open metal tubing 2.

The open tube 2 is formed in a forming mill (not shown) situated in line immediately preceding the apparatus 1. The forming mill is of conventional well known design. The forming mill may contain a plurality of roll stands or dies which form metal strip into the open tube 2. It is to be understood that other roll stands may be situated in line immediately following the apparatus 1 to further form the tubing such as, for example, to correct out of roundness. The roll stands are generally power driven and, therefore, provide means for rapidly and longitudinally advancing the tubing. Alternatively, this means may be power driven weld rolls 6 as shown.

The weld rolls 6 comprise a pair of pressure rollers of known form which engage opposite sides of the tube 2 and cause the longitudinally extending gap 5 therein to become closed substantially at a weld point 7 forming a "V" shaped gap 8. As the open tubing 2 advances to the weld point 7, the edges 3 and 4 at the gap 8 become welded together along the weld seam 9.

The edges 3 and 4 at the "V" shaped gap 8 are heated by means of an induction coil 10.

The coil 10 which will be described in more detail hereinafter is located with its extended nose portion 11 protruding near to the flanges 12 of the weld rolls 6, thereby, effecting a closer proximity to the edges 3 and 4 of the open tube 2 in the vicinity of the weld point 7.

The coil is electrically connected to a source of high frequency current, not shown. The high frequency current is normally at least 10 kilocycles per second and, preferably, at least 100 kilocycles per second or higher. The coil is also connected to a source of cooling medium (not shown) which flows through cooling means to keep it from overheating.

The apparatus 1 may also include the following elements as shown in FIG. 1. An impeder 13 may be included to improve the efficiency of the induction coil 10 by increasing the impedance of the high frequency current paths around the back of the open tube 2. This reduces the flow of current around the back of the tube 2 and increases the flow of current along the tube edges 3 and 4 running from a point on the tube edge 3 adjacent the coil 10 to the weld point 7 and back the opposing tube edge 4 to a point adjacent the coil 10. This results in more efficient heating of the edges 3 and 4 of the open tube 2, the edges being heated up to the welding temperature upon reaching the weld point 7.

The impeder 13 may be of any suitably known construction and comprises a schroud 14 connected to a hollow supporting arm 15 as shown extending down through the gap 5. The actual shape of the schroud 14 shown in FIG. 1 is merely schematic and it may have any suitable shape.

A source of cooling medium (not shown) such as water is connected to the hollow supporting arm 15 for flowing water into the schroud 14 and about a core of magnetic material 16 which is held therein. The magnetic material in the core should be of an insulating nature to provide a core substantially free of eddy current losses. The core is preferably a sintered magnetic oxide insulating material, preferably of types now well known which have a low loss factor and high volume resistivity. A suitable material is marketed under the name "Ferramic" by General Ceramic and Steatite Corporation, the permiability thereof being substantially greater than unity. The cooling medium which passes through the hollow supporting arm 15 flows within the schroud 14 and about the Ferramic core 16 to cool the core and is generally discharged within the welded tube through holes 17.

Further, since the angle of the "V" shaped gap 8 is important, a seam guide means 19 is generally included at a point in advance of the induction coil 10 to accurately space apart the edges of the tube 2 and, thereby, obtain the desired angle. The seam guide means may be formed of any suitable insulating material protruding down into the gap so that the roll stand preceding that position (not shown) will cause the tube gap edges 3 and 4 to be pressed against the opposite sides of the seam guide 19 whereby the edges are maintained with a uniform separation.

Figure 2A:
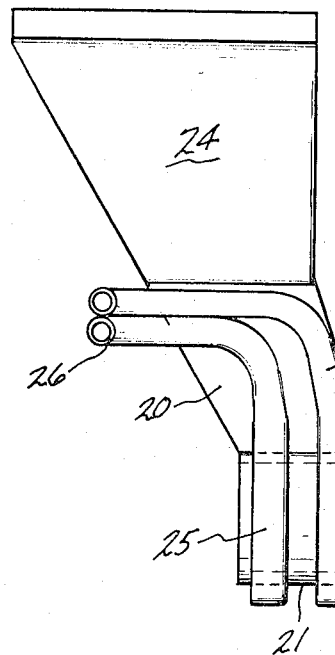
FIG. 2 shows front and side views of a typical induction coil of the prior art.
Figure 2B:
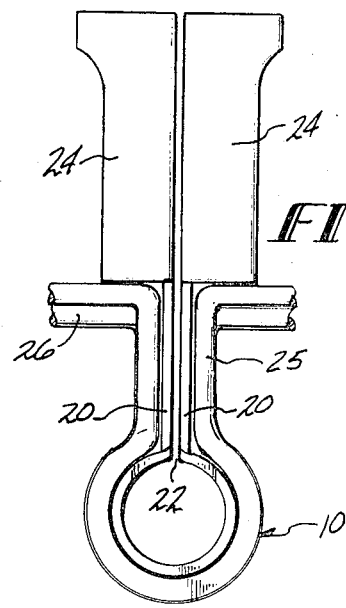

The coil 10 shown in FIG. 1 is supported as shown in FIGS. 2A and 2B by closely spaced web plates 20 which are brazed to the cylindrical portion 21 of the coil. The known coil, therefore, comprises a split cylindrical portion 21 having a gap 22 therein with a nose portion 23 extending out from the cylinder 21 on either side of the gap 22. The web plates 20 in turn are attached to lead blocks 24 for connection to a source of alternating high frequency current as aforenoted. To keep the coil from overheating in normal use, cooling means 25 is conductively bonded to the cylindrical portion 21 of the coil 10 and the web plates 20.

The web plates 20 are normally brazed to the coil 10 such as by silver brazing. The cooling means 25 normally comprises copper tubing which is brazed to the outside surface of the cylindrical portion 21 of the coil. The tubing type cooling means 25 is also brazed to the web plates 20 and is provided with extensions 26 for connection to a source of cooling medium, not shown, which flows through the tubing and keeps the coil from overheating.

The coil 10 of FIGS. 1 and 2 is most useful for welding metals such as steel, aluminum and aluminum base alloys. However, when welding a metal such as copper or copper base alloys, there are significant power losses due to the low resistivity and high heat conductivity of the metal being welded. To compensate for these losses, it is necessary to operate the induction coil at high power levels which result in substantially higher currents flowing in the coil. Generally about ten times as much current flows in the coil when welding copper as compared to steel. Further, by virtue of the proximity effect and coil shape, this current is concentrated toward the nose portion of the coil causing it to overheat and in some instances burn off.

Therefore, when welding copper or copper base alloys, the coil 10 of the prior art as shown in FIGS. 1 and 2 is not adequately cooled and the nose 23 of the coil overheats causing losses of power and a decrease in efficiency. One of the reasons of this overheating is that the cooling means 25 is located too far away from the extended nose 23 of the coil 10.

Therefore, in accordance with this invention, a coil 30 has been designed having increased efficiency and life in service as shown in FIGS. 3A and 3B. As shown therein, the web plates 31 have been extended so they are contiguous with the nose 32 of the coil 30. Preferably, they are extended the complete length of the coil nose 32. Further, the cooling means 33 has been extended to the nose 32 of the coil 30 and is heat conductively bonded as by being brazed to both the coil nose 32 and the web plate 31 extension at the coil nose.

Preferably, a heat conducting mass 34 is built up about the cooling means 33 at the nose 32 of the coil 30. The heat conducting mass is most easily formed of excess brazing material which is used to bond the cooling means 33 to the coil nose 32 and the web plate 31 extension at the coil nose. The use of the heat conducting mass 34 provides a further improvement in the cooling of the nose portion 32 of the coil.

The coil structure except as described above with reference to FIGS. 3A and 3B is substantially identical to the coil structure shown in FIGS. 2A and 2B. The coil, therefore, also comprises a split cylindrical portion 35 which defines a gap 36. The nose portions 32 extend out from the cylindrical portion 35 on either side of the gap 22. The web plates 31 which support the coil 30 are attached to lead blocks 37 which are adapted to be connected to a source of alternating high frequency current.

The coil 30 of this invention is designed with an extended nose 32 which is adapted to protrude between the flanges 12 of the weld rolls 6, thereby effecting a closer proximity to the edges 3 and 4 of the tube 2 which are to be heated prior to weld point 7. The improvement of this invention prevents the nose of the coil from overheating and substantially increases the life and efficiency of the coil. The improved cooling means 33 provided herein also permits the use of nose lengths longer than those of the prior art, thereby providing a still further improvement in coil efficiency.

Therefore, in accordance with this invention, direct cooling is provided to the coil nose 32 through the extension of the cooling means 33 and the web plates 31. A coil 30, as shown in FIG. 3 is particularly applicable to the welding of copper and copper base alloys.

In summary then, in accordance with this invention, an unexpected problem has been discovered which consists of the overheating of the nose portion 23 of the prior art coil 10 when it is operated at high power levels. The problem has been overcome in accordance with this invention by providing means for directly cooling the nose portion 32 of the coil 30.

While the invention has been described with reference to the welding of tubing, the coil is also useful in welding strips of metal or the like together. Further, while the tubing has been shown being butt welded together, other weld structures are well known in the art and could be used.

The split cylindrical member may have any desired cross section to provide the necessary inductive coupling between the work piece and the coil. A flat oval cross section has provided improved coupling when the open tube has a flat oval shape prior to entering the weld rolls. Other split cylindrical member cross sections such as square or hexagonal could be employed in welding structural shapes.

The coil in accordance with this invention is normally employed in welding strip having thicknesses ranging between about 0.005 and 0.1.

It is to be understood that this invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within its spirit and scope as defined by the claims.

What is claimed is:

1. A single turn induction coil adapted to operate at high power levels, said coil comprising:

a split cylindrical member defining a longitudinally extending gap therein;

nose portions extending out from said cylindrical member on both sides of said gap;

web members conductively attached on both sides of said gap to said cylindrical member and said nose portions;

metal tubing heat conductively bonded to said cylindrical member, said nose portions and said web members; and a heat conductive mass at each of said nose portions, said heat conductive mass being bonded to said metal tubing, said web members and said nose portions.

2. A coil as in claim 1 for welding copper or copper base alloys.

* * * * *